United States Patent [19]

Dehner, Jr. et al.

[11] Patent Number: 5,473,612
[45] Date of Patent: Dec. 5, 1995

[54] METHOD AND APPARATUS FOR MINIMIZING FALSE DETECTION OF PACKET DATA IN A COMMUNICATION RECEIVER

[75] Inventors: Leo G. Dehner, Jr., Boynton Beach; Douglas I. Ayerst, Delray Beach; Stephen R. Carsello, Boynton Beach, all of Fla.

[73] Assignee: Motorola, Inc., Schaumburg, Ill.

[21] Appl. No.: 345,668

[22] Filed: Nov. 28, 1994

[51] Int. Cl.[6] .................................................. H04J 3/06
[52] U.S. Cl. .................................... 370/105.4; 375/365
[58] Field of Search ............................. 370/94.1, 105.4, 370/100.1, 106; 375/368, 343, 341, 365, 342; 371/37.7

[56] References Cited

U.S. PATENT DOCUMENTS

| | | | |
|---|---|---|---|
| 4,875,038 | 10/1989 | Siwiak et al. | 379/57 |
| 5,142,279 | 8/1992 | Jasinski et al. | 379/63 |
| 5,181,227 | 1/1993 | Deluca et al. | 375/342 |
| 5,208,812 | 5/1993 | Dudok et al. | 375/368 |
| 5,373,536 | 12/1994 | Dehner, Jr. et al. | 375/365 |
| 5,402,450 | 3/1995 | Lennen | 375/368 |

Primary Examiner—Benedict V. Safourek
Assistant Examiner—Ajit Patel
Attorney, Agent, or Firm—R. Louis Breeden

[57] ABSTRACT

A method and apparatus minimize false detection of packet data in a receiver (202) due to noise in a communication system (100) utilizing time slots (420). Some time slots (420) contain a data packet (418), while others contain only noise. The data packet (418) includes a sync word (602) and an error-detecting code word (604, 606, 608). The receiver (202) is synchronized (1006, 1008) with a nominal predetermined timing of the time slots (420), and determines (1014) time windows (808) for receiving the data packets (418). During each of the time windows (808) data is received, demodulated, and stored (1016), and a predetermined portion of the data stored is searched (1018) to locate a point of maximum correlation between the data and a data template (902) matching the sync word (602). The data packet (418) is decoded (1020) by utilizing the point of maximum correlation as a reference, and the code word (604, 606, 608) of the data packet (418) is examined (1022, 1024) to determine whether the data packet (418) is valid or invalid.

20 Claims, 6 Drawing Sheets

100

*800*

*900*

1100

1108

1114

METHOD AND APPARATUS FOR MINIMIZING FALSE DETECTION OF PACKET DATA IN A COMMUNICATION RECEIVER

FIELD OF THE INVENTION

This invention relates in general to communication receivers, and more specifically to a method and apparatus for minimizing the false detection of packet data in a communication receiver.

BACKGROUND OF THE INVENTION

In a point-to-multipoint communication system having two-way messaging capability, e.g., an acknowledge-back paging system, one way of accommodating confirmations is through forward and reverse channels that operate on a time-division multiplexed (TDM) basis on a shared common frequency. That is, the forward channel periodically transmits information for a first predetermined time followed by transmissions on the reverse channel for a second predetermined time. Alternatively, such systems can utilize two different frequencies for the forward and reverse channels. Typically, such systems also uniquely assign (e.g., via the forward channel transmissions) individual time slots for the multi-point communicators to use for sending messages on the reverse channel, so that multiple confirmation messages from different communicators do not collide. The multipoint communicators typically synchronize their time slot transmissions with the periodic transmissions received from the forward channel, so that a multi-point communicator assigned a time slot will transmit at substantially the same time (with respect to the forward channel timing) as any other multi-point communicator assigned the same time slot. Thus, a reverse channel receiver at the point station also can be synchronized with the periodic transmissions of the forward channel in order to be synchronized with a nominal predetermined timing for receipt of the time slot transmissions of the multipoint communicators.

A difficulty occurs, however, due to variable transmission delays between the point station and the multipoint communicators. Multipoint communicators that are very near the point station will experience very brief transmission delays, while those far from the point station will experience relatively long transmission delays. For example, a communicator thirty miles from the point station will experience a round-trip transmission delay of about 300 microseconds, while a communicator located immediately next to the point station will experience substantially zero transmission delay. For a system operating at 4800 symbols per second, for example, 300 microseconds of transmission delay is approximately 1.5 symbol periods. Because the amount of transmission delay experienced by any given portable multipoint communicator is unpredictable (because the multipoint communicator can move around), the reverse channel receiver at the point station is only approximately synchronized with the reverse channel messages.

To enable exact synchronization of the reverse channel messages for decoding, a synchronization word is transmitted at the beginning of each message. Preferably, for transmission efficiency the synchronization word is a short word comprising only a few, e.g., twelve, symbol periods. Also, because the reverse channel signals generated by the multipoint communicators typically use low-power transmitters, the point station reverse channel receiver must have high sensitivity. Unfortunately, a short synchronization word can easily be falsed by noise in a high sensitivity receiver, i.e., a noise burst can generate a symbol pattern that mimics a short synchronization word. Having been "fooled" by noise into detecting a false sync word, a less-than-robust receiver could continue to "decode" additional noise that is received after the false sync word, thereby interpreting the noise as valid packet data.

Furthermore, in a point-to-multipoint system with two-way messaging, many of the time slots of the reverse channel will often be empty during any given transmission cycle. The empty time slots will thus contain only noise. The point reverse channel receiver has no way of predicting which of the time slots contain valid data and which contain noise. This is because the point receiver does not know which of the multipoint communicators will respond to a forward channel transmission. Also, in addition to transmitting scheduled responses to messages received over the forward channel, the multipoint communicators can transmit unscheduled messages in at least some of the time slots.

Thus, what is needed is a method and apparatus that can minimize false detection of packet data in a receiver due to noise in data packet time slots, wherein the time slots have a nominal predetermined timing for receipt, which timing varies from the actual timing of receipt due to variable transmission delays, and wherein some of the time slots contain a transmitted signal comprising a data packet, while others of the time slots contain only noise.

SUMMARY OF THE INVENTION

An aspect of the present invention is a method for minimizing false detection of packet data in a receiver due to noise in a communication system utilizing data packet time slots that have a nominal predetermined timing for receipt. Some of the time slots contain a transmitted signal comprising a data packet, while others of the time slots contain only noise. The data packet comprises a sync word and an error-detecting code word. The method comprises the steps of synchronizing the receiver with the nominal predetermined timing of the data packet time slots, and determining, from the nominal predetermined timing and an expected range of transmission delays, a plurality of time windows during which transmitted data packets can be received at the receiver. The method further comprises the steps of receiving, demodulating, and storing data derived from the transmitted signal received during each of the plurality of time windows, and searching a predetermined portion of the data stored during each of the plurality of time windows to locate a point of maximum correlation between the data and a data template matching the sync word. The method also includes the steps of decoding the data packet throughout a data packet time slot by utilizing the point of maximum correlation as a reference, and examining the error-detecting code word of the data packet decoded to determine whether the data packet is errored. In addition, the method includes the step of defining the data packet decoded to be a valid data packet if the data packet is not errored and to be an invalid data packet if the data packet is errored.

Another aspect of the present invention is an apparatus for minimizing false detection of packet data in a receiver due to noise in a communication system utilizing data packet time slots that have a nominal predetermined timing for receipt. Some of the time slots contain a transmitted signal comprising a data packet, while others of the time slots contain only noise. The data packet comprises a sync word and an error-detecting code word. The apparatus comprises a first synchronization element for synchronizing the receiver with the nominal predetermined timing of the data packet time slots, and a window determination element coupled to the first synchronization element for determining, from the nominal predetermined timing and an expected range of transmission delays, a plurality of time windows during which transmitted data packets can be received at the receiver. The apparatus further comprises a receiver element coupled to the window determination element for receiving and demodulating the transmitted signal received during each of the plurality of time windows, and a memory element coupled to the receiver element for storing data derived from the transmitted signal. The apparatus also includes a processor coupled to the memory element for searching a predetermined portion of the data stored during each of the plurality of time windows to locate a point of maximum correlation between the data and a data template matching the sync word, and a decoder coupled to the processor for decoding the data packet throughout a data packet time slot by utilizing the point of maximum correlation as a reference. In addition, the apparatus includes an error detector coupled to the decoder for examining the error-detecting code word of the data packet decoded to determine whether the data packet is errored, and a validity definer coupled to the error detector for defining the data packet decoded to be a valid data packet if the data packet is not errored and to be an invalid data packet if the data packet is errored.

Another aspect of the present invention is a receiver for minimizing false detection of packet data due to noise in a communication system utilizing data packet time slots that have a nominal predetermined timing for receipt. Some of the time slots contain a transmitted signal comprising a data packet, while others of the time slots contain only noise. The data packet comprises a sync word and an error-detecting code word. The receiver comprises an antenna for intercepting the transmitted signal, and a first synchronization element for synchronizing the receiver with the nominal predetermined timing of the data packet time slots. The receiver further comprises a window determination element coupled to the first synchronization element for determining, from the nominal predetermined timing and an expected range of transmission delays, a plurality of time windows during which transmitted data packets can be received at the receiver, and a receiver element coupled to the antenna and coupled to the window determination element for receiving and demodulating the transmitted signal received during each of the plurality of time windows. The receiver also includes a memory element coupled to the receiver element for storing data derived from the transmitted signal, and a processor coupled to the memory element for searching a predetermined portion of the data stored during each of the plurality of time windows to locate a point of maximum correlation between the data and a data template matching the sync word. In addition, the receiver includes a decoder coupled to the processor for decoding the data packet throughout a data packet time slot by utilizing the point of maximum correlation as a reference, and an error detector coupled to the decoder for examining the error-detecting code word of the data packet decoded to determine whether the data packet is errored. The receiver further comprises a validity definer coupled to the error detector for defining the data packet decoded to be a valid data packet if the data packet is not errored and to be an invalid data packet if the data packet is errored, and a communication interface coupled to the processor for communicating the valid data packet through a communication link. The receiver also includes a user interface coupled to the processor for allowing a user to monitor and control the receiver.

Another aspect of the present invention is a communication system for minimizing false detection of packet data due to noise. The communication system comprises at least one first transmitter for generating a transmitted signal comprising a data packet transmitted in at least one of a plurality of data packet time slots that have a nominal predetermined timing for receipt by a first receiver. The data packet comprises a sync word and an error-detecting code word. The communication system further comprises the first receiver coupled by a wireless link to the at least one first transmitter for receiving the transmitted signal. The first receiver comprises an antenna for intercepting the transmitted signal. At least one of the plurality of data packet time slots contains the transmitted signal, while others of the plurality of data packet time slots contain only noise. The receiver further comprises a first synchronization element for synchronizing the first receiver with the nominal predetermined timing of the plurality of data packet time slots, and a window determination element coupled to the first synchronization element for determining, from the nominal predetermined timing and an expected range of transmission delays, a plurality of time windows during which transmitted data packets can be received at the first receiver. The receiver also includes a receiver element coupled to the antenna and coupled to the window determination element for receiving and demodulating the transmitted signal received during each of the plurality of time windows, and a memory element coupled to the receiver element for storing data derived from the transmitted signal. In addition, the receiver includes a processor coupled to the memory element for searching a predetermined portion of the data stored during each of the plurality of time windows to locate a point of maximum correlation between the data and a data template matching the sync word, and a decoder coupled to the processor for decoding the data packet throughout a data packet time slot by utilizing the point of maximum correlation as a reference. The receiver further comprises an error detector coupled to the decoder for examining the error-detecting code word of the data packet decoded to determine whether the data packet is errored, and a validity definer coupled to the error detector for defining the data packet decoded to be a valid data packet if the data packet is not errored and to be an invalid data packet if the data packet is errored. The receiver also comprises a link interface coupled to the processor for communicating the valid data packet through a communication link, and a user interface coupled to the processor for allowing a user to monitor and control the first receiver.

DESCRIPTION OF THE PREFERRED EMBODIMENT

Figure 1:
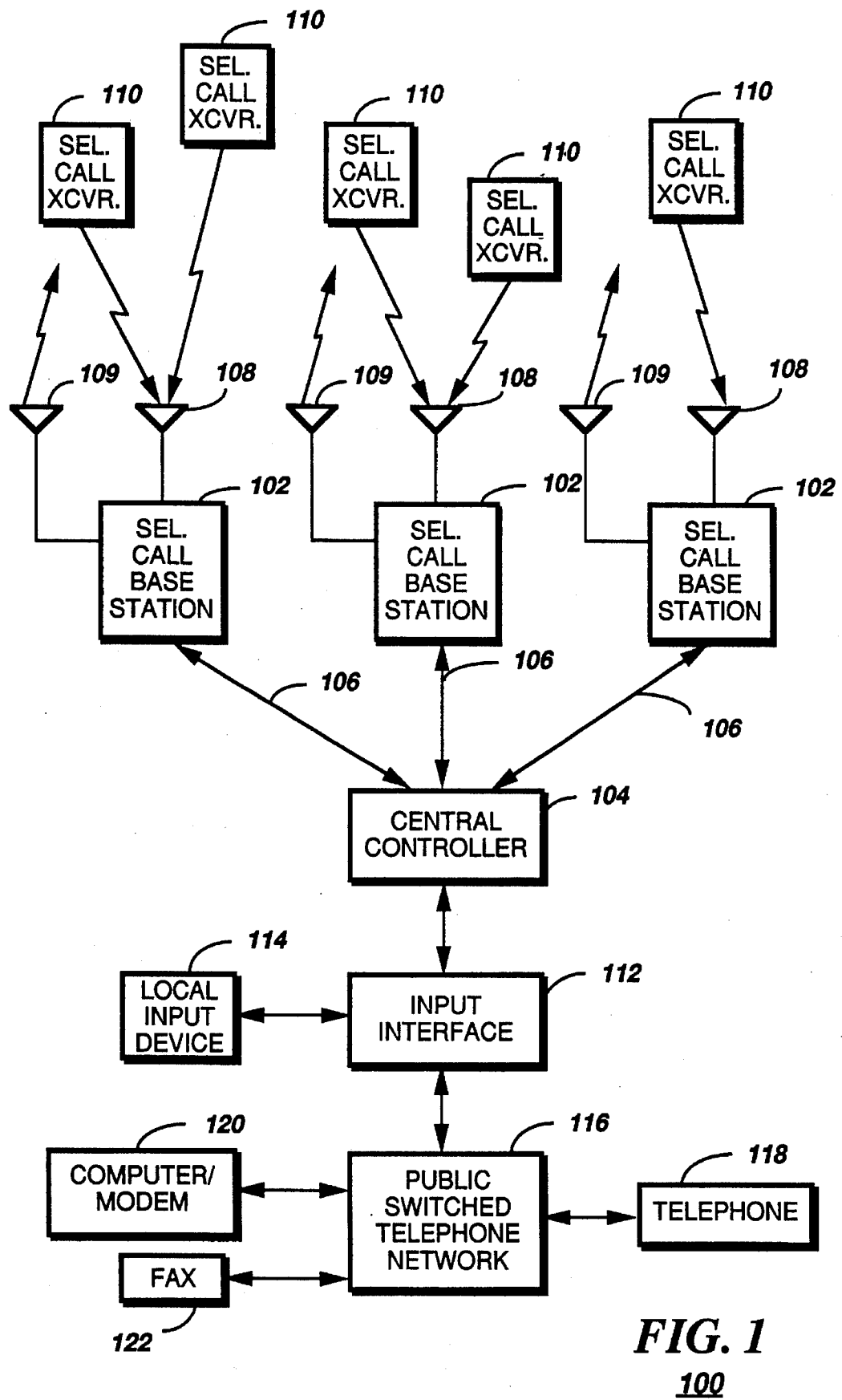
FIG. 1 is an electrical block diagram of a selective call communication system in accordance with the preferred embodiment of the present invention.

With reference to FIG. 1, an electrical block diagram of a selective call communication system 100 in accordance with the preferred embodiment of the present invention comprises a plurality of selective call base stations 102 coupled by communication links 106 to a conventional central controller 104 for controlling the selective call base stations 102. The central controller 104 is preferably similar to the MPS 2000™ paging control center manufactured by Motorola, Inc. of Schaumburg, Ill. Other similar controllers can be utilized as well for the central controller 104. Each of the selective call base stations 102 transmits radio signals to a plurality of selective call transceivers 110 via a transmitting antenna 109. The selective call base stations 102 receive radio signals from the plurality of selective call transceivers 110 via a receiving antenna 108. The radio signals comprise selective call addresses and messages transmitted to the selective call transceivers 110 and acknowledgments received from the selective call transceivers 110. It will be appreciated that the selective call transceivers 110 can also originate messages other than acknowledgments. The central controller 104 is coupled to an input interface 112 for accepting selective call originations from a local input device 114, e.g., a conventional keyboard/display terminal, and from the public switched telephone network (PSTN) 116. Selective call originations from the PSTN 116 can be generated, for example, from a conventional telephone 118, a conventional computer/modem 120, or a conventional facsimile machine 122 coupled to the PSTN 116 in a manner that is well known in the art.

Transmissions between the selective call base stations 102 and the selective call transceivers 110 preferably utilize a well-known selective calling signaling protocol, such as the Motorola FLEX™ protocol. It will be appreciated that other protocols such as the Golay Sequential Code (GSC) or Post Office Code Standardization Advisory Group (POCSAG) protocol can be utilized as well. Forward channel transmissions from the selective call base stations 102 preferably utilize four-level frequency shift keyed (FSK) modulation, operating in the range of sixteen-hundred to thirty-two-hundred symbols-per-second (sps) depending on traffic requirements. Reverse channel transmissions from the selective call transceivers 110 to the selective call base stations 102 preferably utilize four-level FSK modulation at a rate of forty-eight-hundred sps. Reverse channel transmissions preferably occur during predetermined data packet time slots synchronized with the forward channel transmissions. It will be appreciated that other signaling protocols, modulation schemes, and transmission rates can be utilized as well for either or both transmission directions. The forward and reverse channels preferably operate on a single carrier frequency utilizing well-known TDM techniques for sharing the frequency. It will be appreciated that, alternatively, the forward and reverse channels can operate on two different carrier frequencies without requiring the use of TDM techniques.

Figure 2:
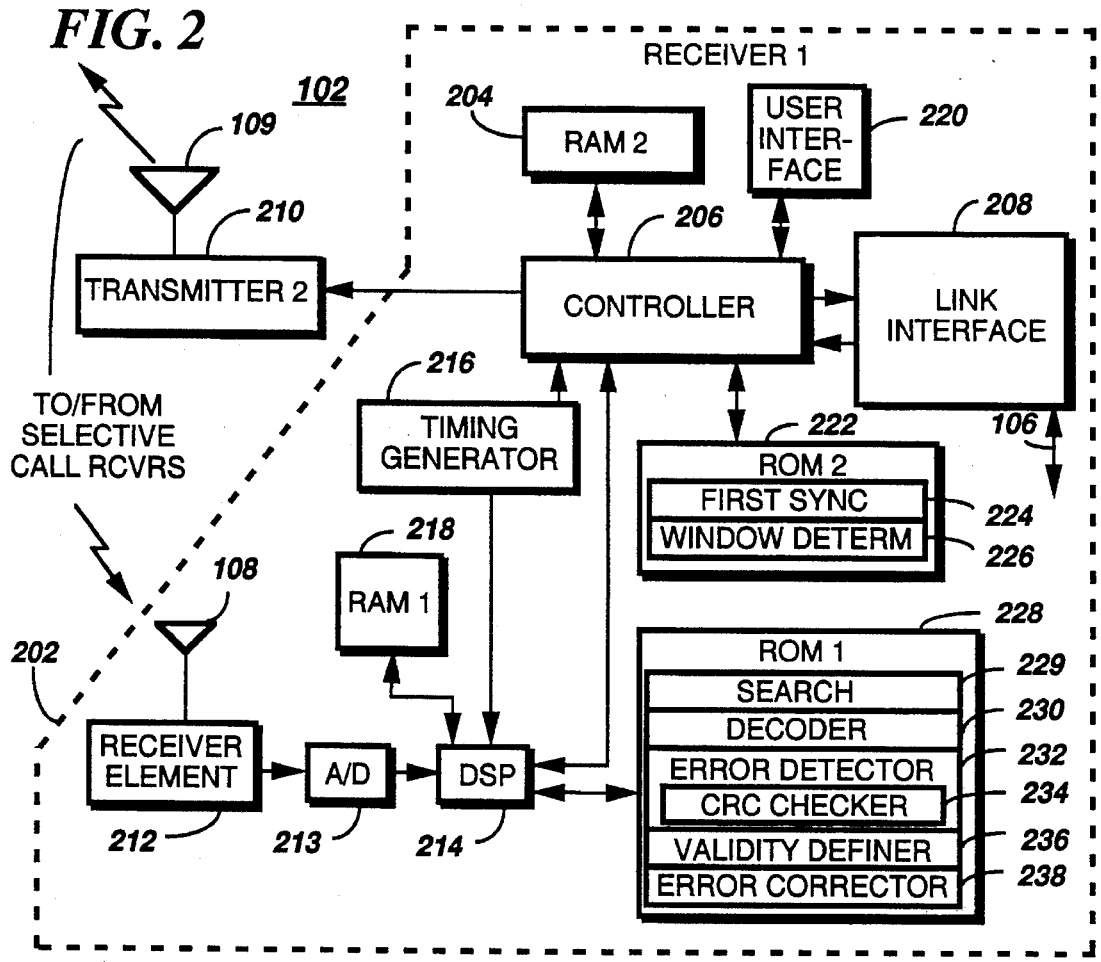
FIG. 2 is an electrical block diagram of a base station in accordance with the preferred embodiment of the present invention.

With reference to FIG. 2, an electrical block diagram of the selective call base station 102 in accordance with the preferred embodiment of the present invention comprises a first receiver 202 including a conventional link interface 208 coupled to the central controller 104 by the communication link 106. Selective call addresses and messages received from the central controller 104 are stored in a conventional random access memory (RAM) 204 until the next transmission cycle. A conventional user interface comprising well-known switches, buttons, dials, and a display is coupled to a controller 206, which controls the operation of the first receiver 202 and of a conventional transmitter 210.

The link interface 208 is coupled to the controller 206 for interoperating therewith. An example of a controller suitable for use in the present invention is Motorola's MC6809 controller. The controller 206 is coupled to a conventional read-only memory (ROM) 222 containing firmware elements in accordance with the preferred embodiment of the present invention. It will be appreciated that other types of memory, e.g., electrically erasable ROM (EEROM) or magnetic disk memory, can be utilized as well for the ROM 228.

The firmware elements include a first synchronization element 224 for synchronizing the first receiver 202 with a nominal predetermined timing of the data packet time slots. The nominal predetermined timing of the data packet time slots is hereby defined as the timing with which transmitted data packets associated with the data packet time slots would be received by the first receiver 202 if there were no transmission delays between the selective call base stations 102 and the plurality of selective call transceivers 110.

The firmware elements also include a window determination element 226 for determining, from the nominal predetermined timing and an expected range of transmission delays, a plurality of time windows during which sync words of the transmitted data packets can be received at the first receiver 202. Preferably, the start of each time window coincides with the start of the corresponding time slot, assuming zero transmission delay. The start and end of the corresponding time slot assuming zero transmission delay is known, because the forward and reverse channels are synchronized with one another, as described herein below.

For the case in which the first receiver 202 and the transmitter 210 are collocated, the end of each time window coincides with the end of the corresponding time slot, assuming zero transmission delay, plus the maximum expected round trip transmission delay. The maximum expected round trip transmission delay is equal to twice the maximum operating distance between the selective call base stations 102 and the plurality of selective call transceivers 110, multiplied by the transmission delay per unit distance, i.e., the reciprocal of the speed of light.

For the case in which the first receiver 202 and the transmitter 210 are not collocated, the first receiver 202 preferably synchronizes itself to the transmitter 210 by monitoring the forward channel transmissions of the transmitter 210. Also, in the non-collocated case, the distance between the first receiver 202 and the transmitter 210 must be considered and an adjustment made to advance the time window to compensate for transmission delay between the transmitter 210 and the first receiver 202, as will be understood by one of ordinary skill in the art. Other factors, such as clock jitter and reference frequency inaccuracies can require that the time window be enlarged slightly to compensate.

For a collocated transmitter and receiver, for example, if the maximum operating distance is thirty miles, and the transmission delay per mile is five microseconds, then the maximum expected round trip transmission delay is 30×2× 5=300 microseconds. The time window corresponding to an example time slot that with no transmission delay would be received during a period lasting from zero to sixteen milliseconds after the end of a forward channel transmission would thus start zero milliseconds after the end of the forward channel transmission, and end 16.3 milliseconds after the end of the forward channel transmission.

A conventional timing generator 216, coupled to the controller 206, provides a high accuracy clock to maintain system timing for communication and approximate synchronization of the selective call communication system 100 including the selective call base stations 102 and the plurality of selective call transceivers 110 by techniques known to one of ordinary skill in the art.

Operationally, the transmitter 210 transmits, to the plurality of selective call transceivers 110, a signal which comprises a paging type message. Preferably, a group of the selective call transceivers 110 are intended (addressed) by the transmitter 210 to receive a paging message. As is well known, the paging message before transmission is encoded with the appropriate address for addressing the group of selective call transceivers of the plurality of selective call transceivers 110. For example, and according to the preferred embodiment of the present invention, when a group of the plurality of the selective call transceivers 110 have been paged, the selective call transceivers 110 of the group that received the message preferably each will transmit acknowledgment responses in temporarily assigned data packet time slots having a predetermined timing with respect to the received forward channel transmissions. A receiver element 212 and the receiving antenna 108, receive the acknowledgment responses. As is well known, the receiver element 212 demodulates the acknowledgment signals to produce a demodulated output signal.

The demodulated output signal is converted (digitized) from an analog signal to a sampled digital signal by an analog-to-digital (A/D) converter 213, well-known to one of ordinary skill in the art. The A/D converter 213 preferably operates at 24,000 samples per second, and thus takes five samples of each symbol at a forty-eight-hundred sps rate. Data converted by the A/D converter 213 is received by a digital signal processor (DSP) 214, then stored in a RAM 218 as received during the plurality of time windows, and then further processed by the DSP 214. The DSP 214, for example, can include a Motorola DSP56100 or a Texas Instrument TMS3000 series digital signal processor. It will be appreciated that other similar DSPs can be used as well for the DSP 214, and that other sampling rates and symbol rates can be selected for use in the selective call communication system 100. It also will be appreciated that the transmitter 210 can be positioned remotely from the other elements of the selective call base station 102, and that the selective call communication system can include receive-only stations similar to the selective call base station 102 but lacking the transmitter 210.

The DSP 214 is coupled to a read only memory (ROM) 228 including firmware elements in accordance with the preferred embodiment of the present invention. It will be appreciated that other types of memory, e.g., electrically erasable ROM (EEROM) or magnetic disk memory, can be utilized as well for the ROM 214. The firmware elements comprise a search element 229 for cooperating with the DSP 214 to search the data stored during each of the plurality of time windows to locate a point of maximum correlation between the data and a data template matching the sync word. The firmware elements further comprise a decoder 230 for decoding a data packet throughout a data packet time slot by utilizing the point of maximum correlation as a reference. In other words, once the search element locates the sync word, then the position of the remaining symbols of the data packet can be determined, and the data packet can thus be decoded.

The firmware elements also include an error detector 232 for examining the error-detecting code word of each data packet decoded to determine whether the data packet is errored. Preferably, the error detector 232 comprises a cyclic redundancy code (CRC) checker 234 for comparing a CRC value included in the error-detecting code word with an information portion of the error-detecting code word to determine whether the data packet is errored. In addition, the firmware elements include a validity definer 236 for defining the data packet decoded to be a valid data packet if the data packet is not errored and to be an invalid data packet if the data packet is errored. Lastly, the firmware elements include an error corrector 238 for performing error correction on the data packet decoded prior to examining by the error detector 232 the error-detecting code word of each data packet decoded to determine whether the data packet is errored.

Figure 3:
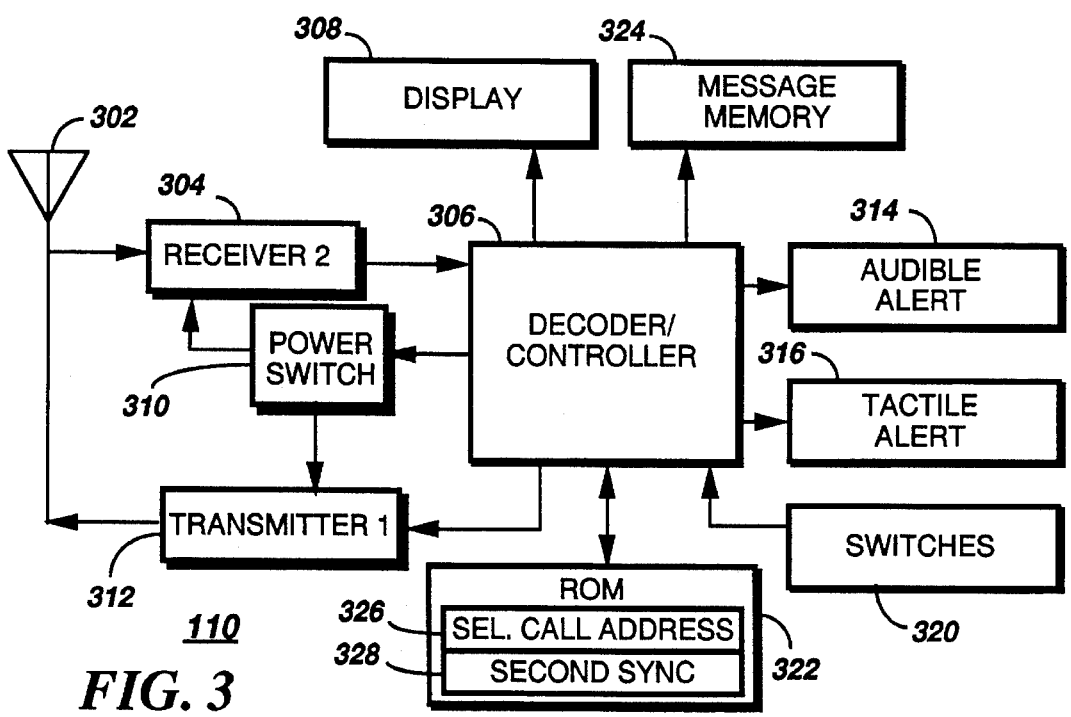
FIG. 3 is an electrical block diagram of a portable selective call transceiver in accordance with the preferred embodiment of the present invention.

With reference to FIG. 3, an electrical block diagram of the selective call transceiver 110 in accordance with the preferred embodiment of the present invention includes an antenna 302 for intercepting the transmitted radio signals which are coupled to the input of a conventional receiver 304. The radio signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well.

The receiver 304 processes the radio signals and produces at the output a data stream representative of demodulated data information. The demodulated data information is coupled into the input of a decoder/controller 306 which processes the information in a manner well known in the art. A transmitter 312 is coupled to the antenna 302 and to the decoder/controller 306. The transmitter 312 is preferably a conventional four-level FSK transmitter operating at a symbol rate of 4800 sps. It will be appreciated that other modulation techniques and symbol rates can be used as well for the transmitter 312.

A conventional power switch 310, coupled to the decoder/controller 306, is used to control the supply of power to the receiver 304, thereby providing a battery saving function, and to the transmitter 312 for transmitting the acknowledgment response subsequent to the receipt of a paging message, as will be further discussed in detail below.

When a selective call address is received by the decoder/controller 306, the received address is compared with one or more addresses 326 stored in a ROM 322, and when a match is detected, an alert signal is generated to alert a user that a selective call message, or page, has been received. It will be appreciated that other types of memory, e.g., electrically erasable ROM (EEROM), can be utilized as well for the ROM 322. The alert signal is directed to a conventional audible alert device 314 for generating an audible alert or to a conventional tactile alert device 316 for generating a silent vibrating alert. Switches 320 allow the user of the selective Call transceiver 110 to, among other things, select between the audible alert 314 and the tactile alert 316 in a manner well known in the art.

The message information which is subsequently received is stored in a message memory 324, preferably a conventional random access memory, and can be accessed by the user for display using one or more of the switches 320, which provide such additional functions as reset, read, and delete, etc. Specifically, by the use of appropriate functions provided by the switches 320, the stored message is recovered from the message memory 324 and processed by the decoder/controller 306 for displaying by a conventional display 308, which enables the user to view the message. The receipt of the message by the selective call transceiver 110 can automatically generate the acknowledgment response to the selective call base station 102 to inform it that the message was successfully received. Preferably, the user will have the opportunity to input a message by using the switches 320 or some other input devices well known to one of ordinary skill in the arts. When the message is entered, the decoder/controller 306 processes the message by encoding an address derived from the received message to generate the acknowledgment response. The encoded acknowledgment response is then transmitted at a time synchronized by a second synchronization element 328 with the forward channel radio signals received from the selective call base station 102 that originated the paging message, by techniques well known to one of ordinary skill in the art.

The decoder/controller 306 preferably is implemented utilizing a microcomputer similar to the MC68HC05 series microcomputer, manufactured by Motorola, Inc. of Schaumburg, Ill. It will be appreciated that other similar microcomputers can be used as well for the decoder/controller 306, and that the message memory 324 also can be included as a portion of the decoder/controller 306.

Figure 4:
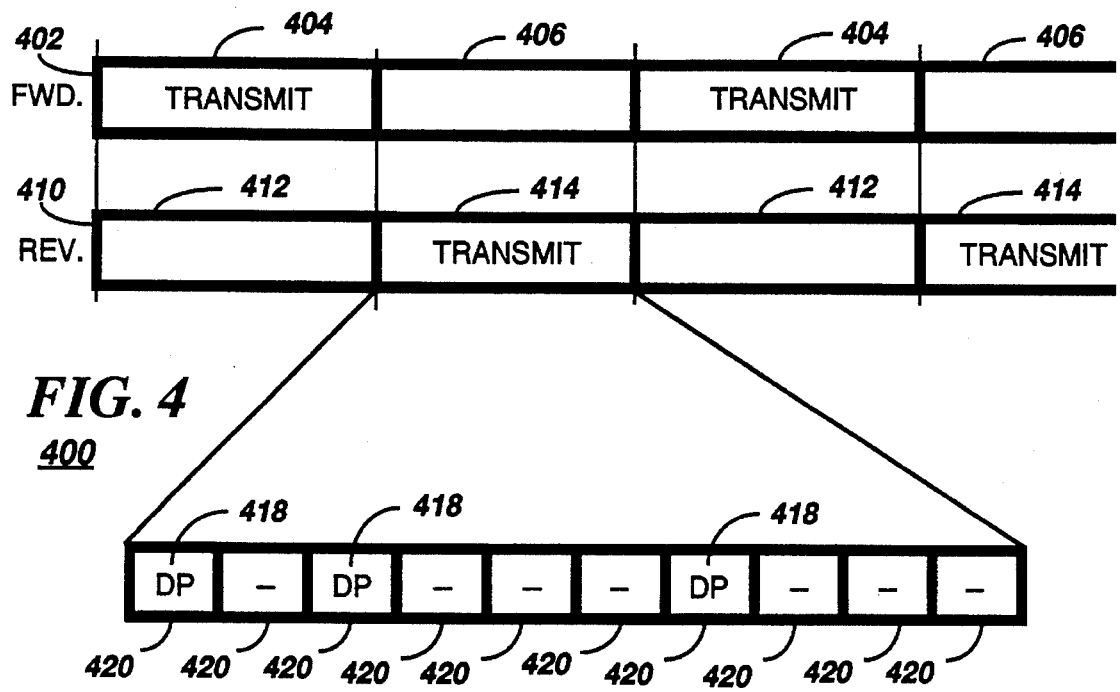
FIG. 4 is a signaling diagram depicting forward and reverse channel signals utilized in the selective call communication system in accordance with the preferred embodiment of the present invention.

Referring to FIG. 4, a signaling diagram 400 depicts a forward channel signal 402 and a reverse channel signal 410 utilized in the selective call communication system 100 in accordance with the preferred embodiment of the present invention. Time is represented horizontally in the signaling diagram 400. Preferably, the forward and reverse channels operate in a time division multiplex (TDM) manner on a common radio frequency (RF). It will be appreciated that, alternatively, the forward and reverse channels can operate on two different frequencies, provided that the transmissions of the forward and reverse channels are coarsely synchronized. The forward channel signal 402 is transmitted from the selective call base station 102 to the selective call transceivers 110 during forward transmit cycles 404, while the reverse channel signal 410 is transmitted from selected ones of the selective call transceivers 110 to the first receiver 202 of the selective call base station 102 during reverse transmit cycles 414. Between the transmit cycles 404, 414 are forward channel silent periods 406 and reverse channel silent periods 412, during which the selective call base station 102 and the selective call transceivers 110 operate to receive the signals transmitted by one another. The reverse channel signal 410 during the reverse transmit cycles 414 comprises data packet time slots 420, which are synchronized by the selective call transceivers 110 to the forward channel signal as received by the second receiver 304 in a manner well known in the art. Some of the data packet time slots 420 contain a data packet 418 transmitted from one of the selective call transceivers 110, while others of the data packet time slots 420 are empty and contain only noise. A portion of the data packet time slots 420 are reserved for use by the selective call transceivers 110 for transmitting unscheduled, i.e., self-initiated, messages. A remainder of the data packet time slots 420 are used by the selective call transceivers for acknowledging messages received on the forward channel.

Figure 5:
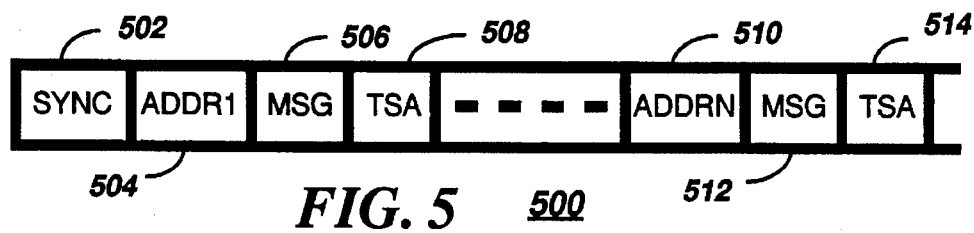
FIG. 5 is a signaling diagram depicting the forward channel signal in greater detail in accordance with the preferred embodiment of the present invention.

Referring to FIG. 5, a signaling diagram 500 depicts the forward channel signal 402 in greater detail in accordance with the preferred embodiment of the present invention. Each transmission of the forward channel signal preferably begins with a synchronization portion 502 utilized by the selective call transceivers for synchronizing with the forward channel signal 402 in a well-known manner. The synchronization portion 502 is followed by a plurality of information portions, each comprising a selective call address 504, 510, a message 506, 512, and a time slot assignment 508, 514 for the addressed selective call transceiver 110 to use for responding on the reverse channel. Preferably, the forward channel signal 402 comprises a well-known signaling protocol, such as Motorola's FLEX™ protocol. It will be appreciated that other signaling protocols can be used as well.

Figure 6:
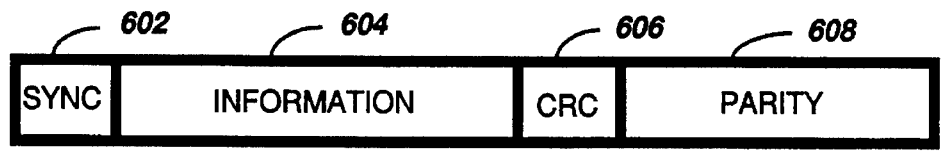
FIG. 6 is a signaling diagram depicting a data packet of the reverse channel signal in accordance with the preferred embodiment of the present invention.

Referring to FIG. 6, a signaling diagram depicts the data packet 418 of the reverse channel signal 410 in accordance with the preferred embodiment of the present invention. The data packet 418 preferably comprises a synchronization word 602, followed by a Reed-Solomon (RS) code word. The RS code word is an error-correcting and error-detecting code word. The RS code word comprises an information portion 604, a cyclic redundancy code (CRC) portion 606, and a parity portion 608.

Preferably, the synchronization (sync) word 602 is twelve symbols in length, the RS code word information portion 604 is twenty-six symbols long, the CRC portion 606 is six symbols long, and the parity portion 608 is twenty symbols long. After the sync word 602 has been located, as described herein below, the decoder 230 and the DSP 214 cooperate to decode the RS code word in accordance with the preferred embodiment of the present invention. Then the decoded RS code word is error corrected and error detected utilizing the Berlkamp-Massey technique as is well known in the art. This technique utilizes the parity portion 608 to detect and correct errors in the RS code word. In addition, the CRC portion 606 is compared conventionally with the information portion 604 to further ensure that the RS code word is error free before the RS code word is accepted as valid data. Advantageously, by first locating the sync word 602 in order to decode the data, and then utilizing both the Berlkamp-Massey technique and the CRC check, the probability of falsely decoding as valid data a time slot containing only noise is reduced to about one in one million.

Figure 7:
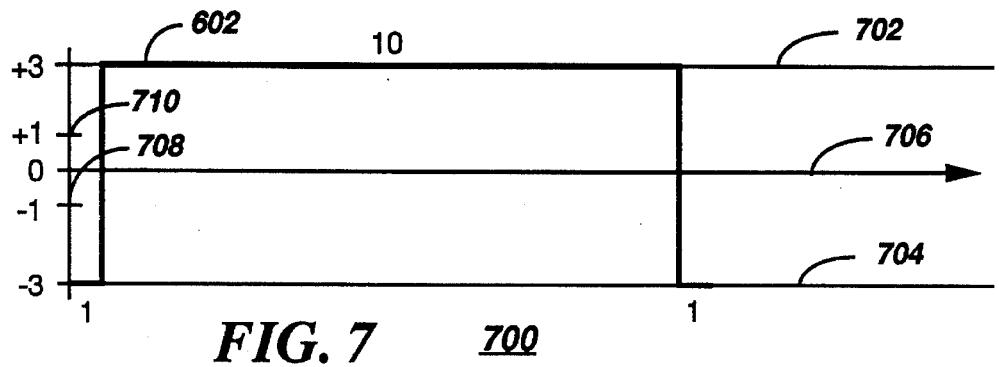
FIG. 7 is a symbol diagram depicting a sync word in accordance with the preferred embodiment of the present invention.

Referring to FIG. 7, a symbol diagram 700 depicts the sync word 602 of the data packet 418 in accordance with the preferred embodiment of the present invention. The symbol diagram 700 indicates a +value 702, a +1 value 710, a −1 value 708, and a −3 value 704, corresponding to four valid symbol values and four levels of FSK modulation. The 0 value 706 corresponds to unmodulated carrier. Preferably, the sync word 602 comprises twelve symbols, the first symbol having the −3 value 704, the next ten symbols having the +3 value 702, and the last symbol having the −3 value 704. The values utilized for the sync word 602 were chosen to minimize the effect of noise on the correlation. It will be appreciated that, alternatively, other sync word values and lengths can be utilized for the sync word 602.

Figure 8:
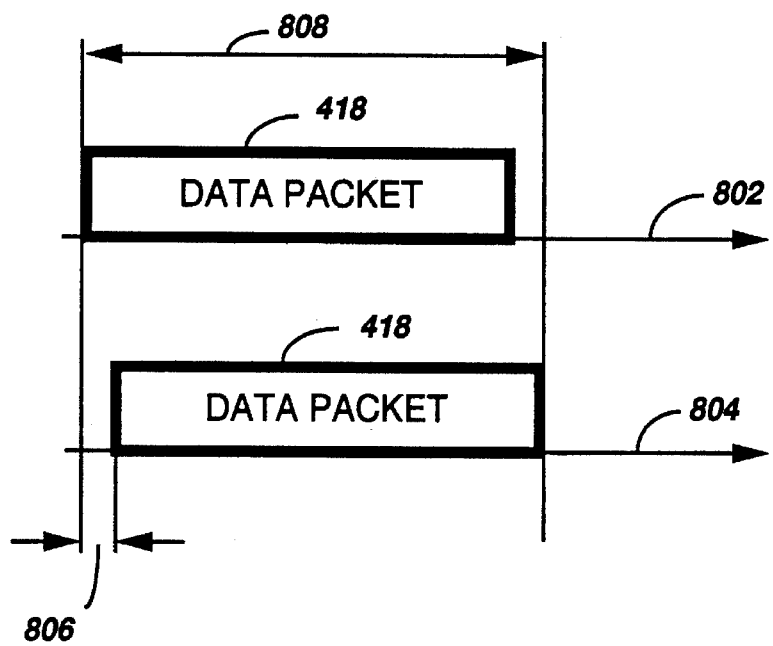
FIG. 8 is a signaling diagram depicting the effect of variable transmission delay with regard to timing of the data packet.

Referring to FIG. 8, a signaling diagram 800 depicts the effect of variable transmission delay with regard to timing of the data packet 418. The data packet 418 positioned on the upper axis 802 represents the nominal predetermined timing for receipt of the data packet 418 by the first receiver 202, i.e., the timing of the data packet assuming zero transmission delay. The nominal predetermined timing of the data packet time slots is known to the first receiver 202, because the timing of the data packet time slots 420 of the reverse channel signal 410 is known relative to the start of the reverse channel signal 410, and because the start of the reverse channel signal 410 is synchronized with the forward channel signal 402, and because the first receiver 202 is also synchronized with the forward channel signal 402 through the controller 206.

Variable transmission delay, however, does affect the actual timing of the receipt of the data packet by the first receiver 202. The data packet 418 positioned on the lower axis 804 represents the latest predetermined timing for receipt of the data packet 418 by the first receiver 202, i.e., the timing of the data packet assuming a maximum transmission delay 806. The maximum transmission delay 806 is the round trip transmission delay between the selective call base station 102 and a selective call transceiver 110 located at a predetermined maximum operating distance from the selective call base station 102. The effect of the variable transmission delay is to create a time window 808 during which the data packet 418 can be received by the first receiver 202. A plurality of the time windows 808 corresponding to the data packet time slots 420 is determined by the window determination element 226 for use in decoding the data packets 418 in accordance with the preferred embodiment of the present invention.

As discussed herein above, if the transmitter 210 and the first receiver 202 are not collocated, the time window 808 will have to be advanced slightly to compensate for transmission delay between the transmitter 210 of the forward channel and the first receiver 202. As both the transmitter 210 and the first receiver 202 preferably operate at fixed locations, the transmission delay therebetween is a constant value that can be determined easily by one of ordinary skill in the art.

Figure 9:
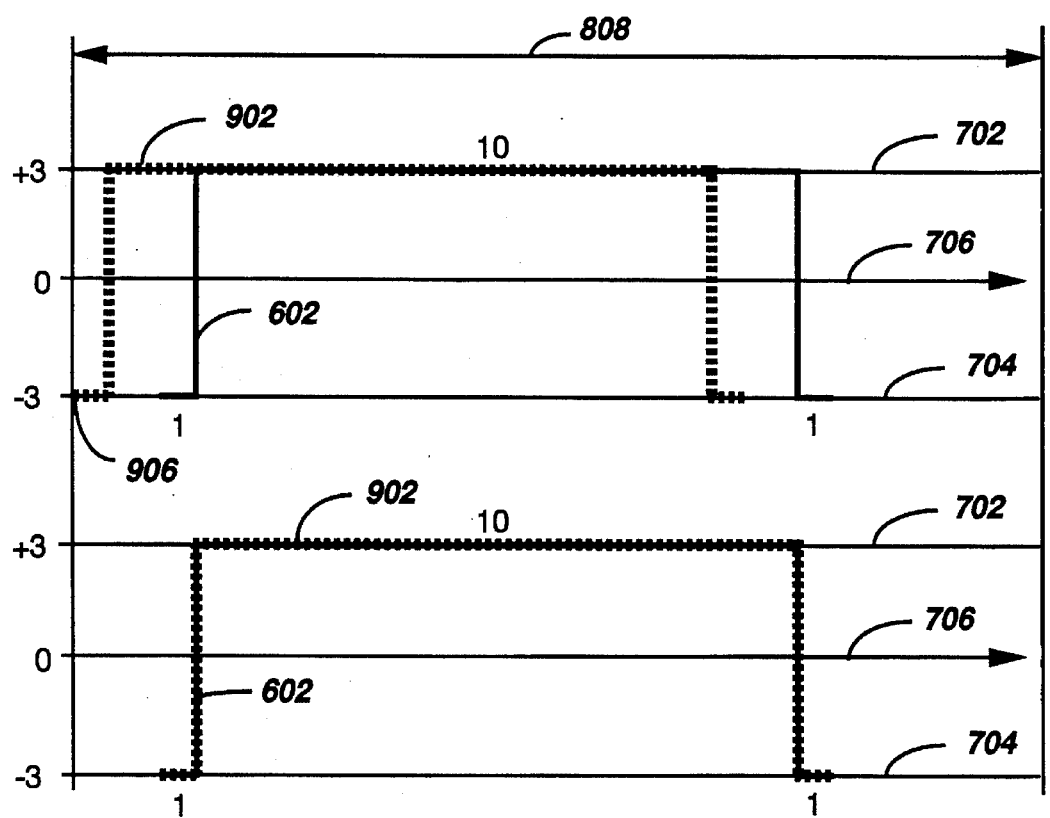
FIG. 9 is a symbol diagram depicting a data template for locating the sync word in accordance with the preferred embodiment of the present invention.

Referring to FIG. 9, a symbol diagram 900 depicts a data template 902 for locating the sync word 602 in accordance with the preferred embodiment of the present invention. The data template 902 is a single data template, shown in two different positions for illustrative purposes. The shape of the data template 902 is similar to the shape of the sync word 602 as depicted in FIG. 7. To locate the sync word 602 after data has been derived and stored for each of the plurality of time Windows 808, the search element 229 cooperates with the DSP 214 to search the data corresponding to one of the time windows 808 for the point of maximum correlation between the data and the data template 902.

While for illustrative purposes the data template 902 is depicted in FIG. 9 as a smooth shape, in order to simplify the correlation calculations the data template 902 is zero-stuffed for the calculations, such that only one sample per symbol is utilized. For example, assuming five samples per symbol, the values utilized for the data template 902 would be:

/0,0,−3,0,0/0,0,+3,0,0/0,0,+3,0,0/ . . . /0,0,+3,0,0/0,0,−3,0,0/, in which expression the slashes depict the symbol boundaries.

Preferably, to locate the point of maximum correlation, the beginning point 906 of the data template 902 is positioned mathematically at the beginning of the time window 808 and a pointwise multiplication of the data template 902 and each corresponding digitized sample of the data is performed. The resulting products are summed and the sum and position of the data template are stored in the RAM 218. Next, the data template 902 is positioned one sample period later in the time window 808 and the pointwise multiplication, summing, and storing is repeated. This process is repeated continuously until the beginning point 906 of the data template 902 is positioned at the sample period corresponding to the beginning of the time window 808, plus the maximum transmission delay 806.

Next, the search element 229 and the DSP 214 examine the stored sums for the time window 808 to find the largest sum. The position of the data template 902 corresponding to the largest stored sum is deemed to be the position of the sync word 602 as received in the time window 808. The point of maximum correlation between the data and the data template 902 is depicted in the lower half of the symbol diagram 900, in which the sync word 602 and the data template 902 are aligned. Once the position of the sync word 602 has been determined, the decoder 230 and the DSP 214 cooperate to decode the remainder of the data packet 418 by determining the symbol values corresponding to each symbol period of the data packet, as referenced from the position of the sync word 602.

Figure 10:
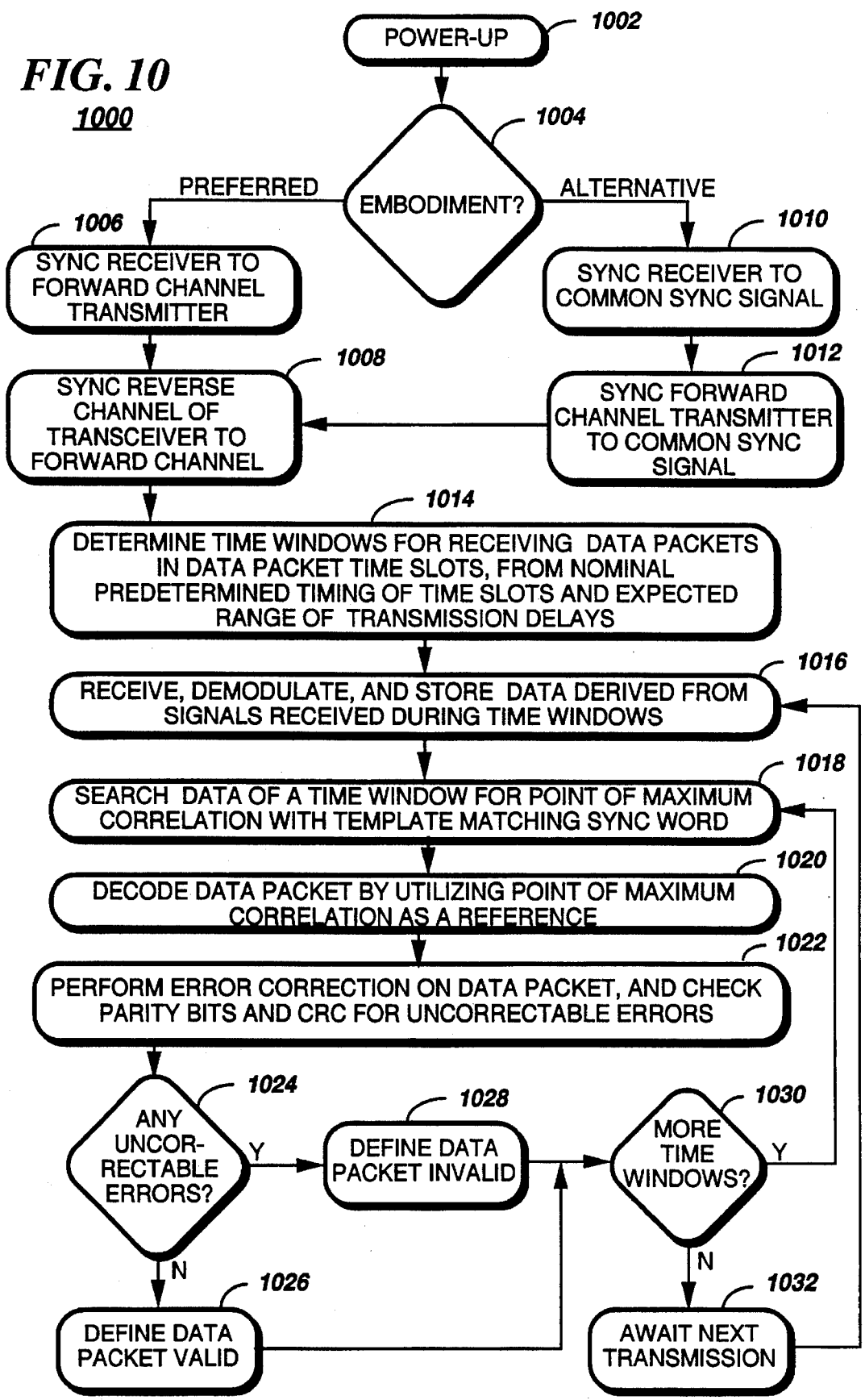
FIG. 10 is a flow chart depicting operation of the selective call communication system in accordance with the preferred embodiment of the present invention.

Referring to FIG. 10, a flow chart 1000 depicts operation of the selective call communication system 100 in accordance with the preferred embodiment of the present invention. After power-up 1002 of the system, approximate synchronization of the first receiver 202 with the received reverse channel data packets 418 occurs. In the preferred embodiment the first receiver 202 is synchronized 1006 to the forward channel transmissions of the transmitter 210. If the first receiver 202 and the transmitter 210 are collocated, this is easily accomplished by the first synchronization element 224, because the first receiver 202 and the forward channel transmissions of the transmitter 210 are both controlled by the controller 206. If the first receiver 202 and the transmitter 210 are not collocated, the first receiver 202 preferably monitors the forward channel transmitted by the transmitter 210 to acquire synchronization information therefrom. The synchronization information is then shared with the first synchronization element 224, which cooperates with the timing generator 216 to maintain the synchronization of the first receiver 202 between forward channel transmissions in a manner well known in the art. Then the reverse channel transmissions of the plurality of 3.5 selective call transceivers 110 are synchronized 1008 by the decoder/controller 306 with the forward channel transmissions of the transmitter 210, as received by the plurality of second receivers 304.

In an alternative embodiment, both a receiver 1114 (FIG. 11) and a transmitter 1108 (FIG. 11) are synchronized 1010, 1012 to a common synchronization signal, such as a Global Positioning Satellite (GPS). Then the reverse channel transmissions of the plurality of selective call transceivers 110 are synchronized 1008 by the decoder/controller 306 with the forward channel transmissions of the transmitter 1108, as received by the plurality of second receivers 304. The alternative embodiment is described further below.

Next, the window determination element 226 determines 1014 the time windows 808 for receiving the data packets 418 in the data packet time slots 420. The time windows 808 are determined as discussed above from the nominal predetermined timing of the time slots and the expected maximum transmission delay 806. Then .data derived from the signals received during each of the time windows is received, demodulated, and stored 1016 by the first receiver 202. The data received during a time window 808 is then searched 1018 as described above to determine the point of maximum correlation with a template matching the sync word 602. Preferably, the maximum correlation sum computed does not have to exceed a minimum value, because the point of maximum correlation is used only as an aid in locating the data packet. The correlation sum is not used to ensure the presence of a valid data packet. Falsing is controlled by error detection capabilities of the data packet code word, as described below.

Next, the DSP 214 and the decoder 230 decode 1020 the data packet 418 by utilizing the point of maximum correlation as a reference, as described herein above. The DSP 214 and the error corrector 238 then perform 1022 conventional error correction on the RS code word, utilizing the parity portion 608 and the CRC portion 606 to determine whether there are uncorrectable errors remaining in the data packet 418. Those data packet time slots 420 that contain only noise will initially be decoded as if they contained a data packet 418. The decoded data from such data packet time slots 420, however, generally will contain many uncorrectable errors.

In step 1024 the DSP 214 checks whether there are uncorrectable errors. If so, the data packet 418 is defined 1028 to be invalid. If there are no uncorrectable errors, the DSP defines 1026 the data packet 418 to be valid. Then the DSP 214 checks 1030 whether there are more time windows 808 to decode. If so, the flow returns to step 1018 to search a next time window 808. If there are no more time windows 808 to check, the first receiver 202 then awaits 1032 a next reverse channel transmission, after which the flow returns to step 1016 to receive, demodulate, and store the incoming data.

Figure 11:
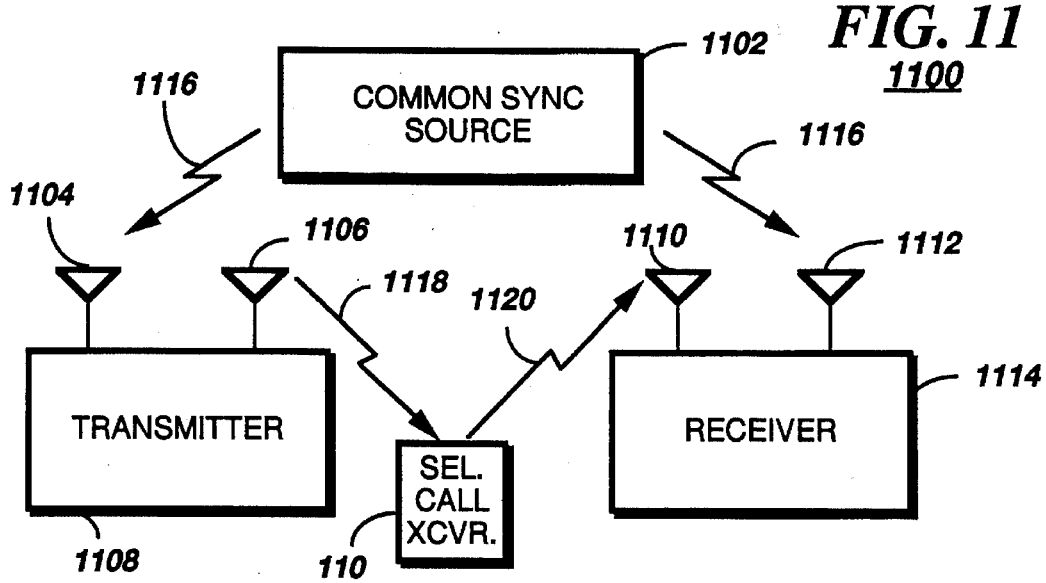
FIG. 11 is an electrical block diagram of a communication system in accordance with an alternative embodiment of the present invention.

Referring to FIG. 11, an electrical block diagram of a communication system 1100 in accordance with an alternative embodiment of the present invention comprises a common synchronization source 1102, such as a Global Positioning Satellite (GPS). The communication system 1100 further comprises a transmitter 1108 having a first sync antenna 1104 for intercepting a common sync signal 1116 transmitted by radio from the common synchronization source 1102. The transmitter 1108 is coupled to a transmission antenna 1106 for transmitting a forward channel signal 1118 to the selective call transceiver 110, which in turn transmits a reverse channel signal to a communication antenna 1110 of a receiver 1114. The receiver 1114 also has a second sync antenna 1112 for intercepting the common sync signal 1116 from the common synchronization source 1102. In operation, the transmitter 1108 and the receiver 1114 synchronize their transmission and reception, respectively, with the common sync signal 1116 from the common synchronization source 1102. The selective call transceiver 110 synchronizes its reverse channel transmissions with the forward channel transmissions received, as described herein above in accordance with the preferred embodiment, thereby coarsely synchronizing the receiver 1114 with the reverse channel transmissions. It will be appreciated that other sources, such as a radio or television station, or a telephone network synchronization signal can be utilized as well for the common synchronization source 1102, and that the common sync signal 1116 can be coupled to the transmitter 1108 and receiver 1114 by a communication link other than radio, e.g., a wireline or optical link.

Figure 12:
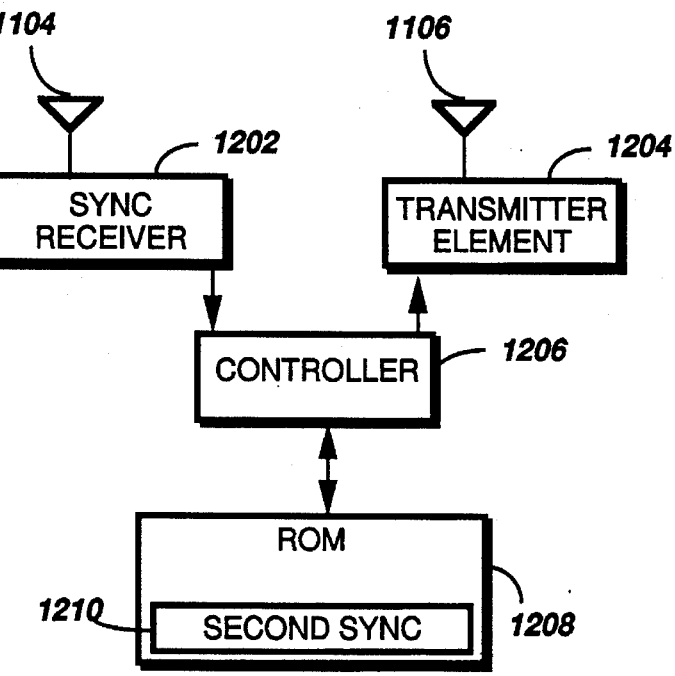
FIG. 12 is an electrical block diagram of a transmitter in accordance with the alternative embodiment of the present invention.

Referring to FIG. 12, an electrical block diagram of the transmitter 1108 in accordance with the alternative embodiment of the present invention comprises a sync receiver 1202 coupled to the first sync antenna 1104 for receiving the common sync signal 1116 and deriving a sync output signal therefrom. The sync receiver is preferably a conventional GPS receiver. The sync output signal is coupled to a controller 1206 for controlling the transmitter 1108. The controller is coupled to a conventional ROM 1208 comprising a second sync element 1210 for synchronizing the transmitter 1108 to the common sync signal 1116 in a well-known manner. The controller 1206 is also coupled to a conventional transmitter element 1204 for transmitting the forward channel signal 1118 synchronized with the common sync signal 1116. The controller 1206 preferably is implemented utilizing a microcomputer similar to the MC68HC05 series microcomputer, manufactured by Motorola, Inc. of Schaumburg, Ill. It will be appreciated that other similar microcomputers can be used as well for the controller 1206. It will be further appreciated that other types of memory, e.g., electrically erasable ROM (EEROM) or magnetic disk memory, can be utilized as well for the ROM 1208.

Figure 13:
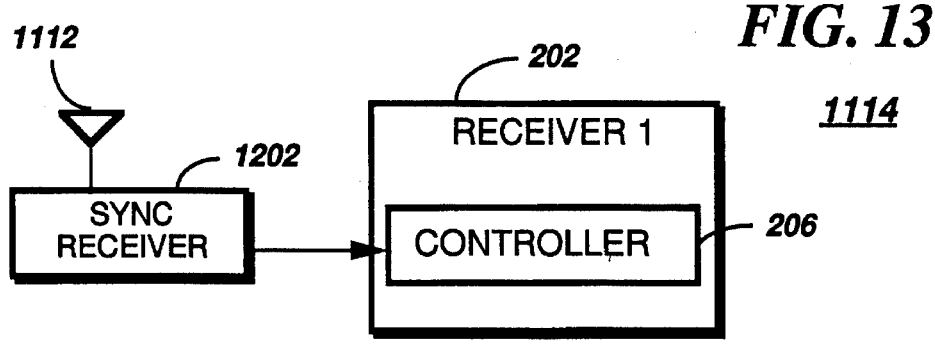
FIG. 13 is an electrical block diagram of a receiver in accordance with the alternative embodiment of the present invention.

Referring to FIG. 13, an electrical block diagram of the receiver 1114 in accordance with the alternative embodiment of the present invention comprises the second sync antenna 1112 coupled to the sync receiver 1202 for receiving the common sync signal 1116 and deriving a sync output signal therefrom. The receiver 1114 further comprises the first receiver 202. The sync output signal is coupled to the controller 206 of the first receiver 202 for synchronizing the first receiver 202 with the common sync signal 1116.

Thus, the present invention provides a method and apparatus that minimizes false detection of packet data in a receiver due to noise in data packet time slots, wherein the time slots have a nominal predetermined timing for receipt, which timing varies from the actual timing of receipt due to variable transmission delays, and wherein some of the time slots contain a transmitted signal comprising a data packet, while others of the time slots contain only noise. The present invention is particularly useful in an acknowledge-back selective call communication system, which requires a highly sensitive reverse channel receiver that is not easily falsed by the random noise present in the unused data packet time slots of the reverse channel.

What is claimed is:

1. A method for minimizing false detection of packet data in a receiver due to noise in a communication system utilizing data packet time slots that have a nominal predetermined timing for receipt, wherein some of the time slots contain a transmitted signal comprising a data packet, while others of the time slots contain only noise, and wherein the data packet comprises a sync word and an error-detecting code word, the method comprising the steps of:

synchronizing the receiver with the nominal predetermined timing of the data packet time slots;

determining, from the nominal predetermined timing and an expected range of transmission delays, a plurality of time windows during which transmitted data packets can be received at the receiver;

receiving, demodulating, and storing data derived from the transmitted signal received during each of the plurality of time windows;

searching a predetermined portion of the data stored during each of the plurality of time windows to locate a point of maximum correlation between the data and a data template matching the sync word;

decoding the data packet throughout a data packet time slot by utilizing the point of maximum correlation as a reference;

examining the error-detecting code word of the data packet decoded to determine whether the data packet is errored; and defining the data packet decoded to be a valid data packet if the data packet is not errored and to be an invalid data packet if the data packet is errored.

2. The method of claim 1, wherein the error-detecting code word is also an error-correcting code word, and wherein the method further comprises the step of performing error correction on the data packet decoded prior to performing the examining step.

3. The method of claim 1, wherein the error-detecting code word comprises a cyclic redundancy code (CRC) value, and wherein the examining step comprises the step of comparing the CRC value with an information portion of the error-detecting code word to determine whether the data packet is errored.

4. The method of claim 1, wherein the communication system utilizes a forward channel transmitted by a transmitter to a plurality of portable transceivers, and wherein some of the plurality of portable transceivers transmit the transmitted signal comprising the data packet in uniquely assigned ones of the data packet time slots on a reverse channel, and wherein the synchronizing step comprises the steps of:

synchronizing the receiver to the forward channel transmitted by the transmitter; and synchronizing the reverse channel transmitted by some of the plurality of portable transceivers with forward channel transmissions received from the transmitter.

5. The method of claim 4, wherein the communication system utilizes a common synchronization signal shared by the receiver and by the transmitter, and wherein the step of synchronizing the receiver to the forward channel transmitted by the transmitter comprises the steps of:

synchronizing the forward channel transmitted by transmitter to the common synchronization signal; and synchronizing the receiver to the common synchronization signal, thereby synchronizing the receiver to the forward channel transmitted by the transmitter.

6. An apparatus for minimizing false detection of packet data in a receiver due to noise in a communication system utilizing data packet time slots that have a nominal predetermined timing for receipt, wherein some of the time slots contain a transmitted signal comprising a data packet, while others of the time slots contain only noise, and wherein the data packet comprises a sync word and an error-detecting code word, the apparatus comprising:

a first synchronization element for synchronizing the receiver with the nominal predetermined timing of the data packet time slots;

a window determination element coupled to the first synchronization element for determining, from the nominal predetermined timing and an expected range of transmission delays, a plurality of time windows during which transmitted data packets can be received at the receiver;

a receiver element coupled to the window determination element for receiving and demodulating the transmitted signal received during each of the plurality of time windows;

a memory element coupled to the receiver element for storing data derived from the transmitted signal;

a processor coupled to the memory element for searching a predetermined portion of the data stored during each of the plurality of time windows to locate a point of maximum correlation between the data and a data template matching the sync word;

a decoder coupled to the processor for decoding the data packet throughout a data packet time slot by utilizing the point of maximum correlation as a reference;

an error detector coupled to the decoder for examining the error-detecting code word of the data packet decoded to determine whether the data packet is errored; and a validity definer coupled to the error detector for defining the data packet decoded to be a valid data packet if the data packet is not errored and to be an invalid data packet if the data packet is errored.

7. The apparatus of claim 6, wherein the error-detecting code word is also an error-correcting code word, and wherein the apparatus further comprises an error corrector coupled to the decoder for performing error correction on the data packet before the error detector determines whether the data packet is errored.

8. The apparatus of claim 6, wherein the error-detecting code word comprises a cyclic redundancy code (CRC) value, and wherein the error detector comprises a CRC checker for comparing the CRC value with an information portion of the error-detecting code word to determine whether the data packet is errored.

9. The apparatus of claim 6, wherein the communication system utilizes a forward channel transmitted by a transmitter to a plurality of portable transceivers, and wherein some of the plurality of portable transceivers transmit the transmitted signal comprising the data packet in uniquely assigned ones of the data packet time slots on a reverse channel, and wherein the plurality of portable transceivers comprise a plurality of second synchronization elements for synchronizing the reverse channel with the forward channel, and wherein the first synchronization element is coupled to the transmitter for synchronizing the receiver with the forward channel, thereby synchronizing the receiver with the nominal predetermined timing of the data packet time slots.

10. The apparatus of claim 6, wherein the communication system utilizes a forward channel transmitted by a transmitter to a plurality of portable transceivers, and wherein some of the plurality of portable transceivers transmit the transmitted signal comprising the data packet in uniquely assigned ones of the data packet time slots on a reverse channel, and wherein the plurality of portable transceivers comprise a plurality of second synchronization elements for synchronizing the reverse channel with the forward channel, and wherein the transmitter of the forward channel is synchronized to a common synchronization signal, and wherein the first synchronization element is coupled to the common synchronization signal for synchronizing the receiver with the common synchronization signal, thereby synchronizing the receiver with the nominal predetermined timing of the data packet time slots.

11. A receiver for minimizing false detection of packet data due to noise in a communication system utilizing data packet time slots that have a nominal predetermined timing for receipt, wherein some of the time slots contain a transmitted signal comprising a data packet, while others of the time slots contain only noise, and wherein the data packet comprises a sync word and an error-detecting code word, the receiver comprising:

an antenna for intercepting the transmitted signal;

a first synchronization element for synchronizing the receiver with the nominal predetermined timing of the data packet time slots;

a window determination element coupled to the first synchronization element for determining, from the nominal predetermined timing and an expected range of transmission delays, a plurality of time windows during which transmitted data packets can be received at the receiver;

a receiver element coupled to the antenna and coupled to the window determination element for receiving and demodulating the transmitted signal received during each of the plurality of time windows;

a memory element coupled to the receiver element for storing data derived from the transmitted signal;

a processor coupled to the memory element for searching a predetermined portion of the data stored during each of the plurality of time windows to locate a point of maximum correlation between the data and a data template matching the sync word;

a decoder coupled to the processor for decoding the data packet throughout a data packet time slot by utilizing the point of maximum correlation as a reference;

an error detector coupled to the decoder for examining the error-detecting code word of the data packet decoded to determine whether the data packet is errored;

a validity definer coupled to the error detector for defining the data packet decoded to be a valid data packet if the data packet is not errored and to be an invalid data packet if the data packet is errored;

a communication interface coupled to the processor for communicating the valid data packet through a communication link; and a user interface coupled to the processor for allowing a user to monitor and control the receiver.

12. The receiver of claim 11, wherein the error-detecting code word is also an error-correcting code word, and wherein the receiver further comprises an error corrector coupled to the decoder for performing error correction on the data packet before the error detector determines whether the data packet is errored.

13. The receiver of claim 11, wherein the error-detecting code word comprises a cyclic redundancy code (CRC) value, and wherein the error detector comprises a CRC checker for comparing the CRC value with an information portion of the error-detecting code word to determine whether the data packet is errored.

14. The receiver of claim 11, wherein the communication system utilizes a forward channel transmitted by a transmitter to a plurality of portable transceivers, and wherein some of the plurality of portable transceivers transmit the transmitted signal comprising the data packet in uniquely assigned ones of the data packet time slots on a reverse channel, and wherein the plurality of portable transceivers comprise a plurality of second synchronization elements for synchronizing the reverse channel with the forward channel, and wherein the first synchronization element is coupled to the transmitter for synchronizing the receiver with the forward channel, thereby synchronizing the receiver with the nominal predetermined timing of the data packet time slots.

15. The receiver of claim 11, wherein the communication system utilizes a forward channel transmitted by a transmitter to a plurality of portable transceivers, and wherein some of the plurality of portable transceivers transmit the transmitted signal comprising the data packet in uniquely assigned ones of the data packet time slots on a reverse channel, and wherein the plurality of portable transceivers comprise a plurality of second synchronization elements for synchronizing the reverse channel with the forward channel, and wherein the transmitter of the forward channel is synchronized to a common synchronization signal, and wherein the first synchronization element is coupled to the common synchronization signal for synchronizing the receiver with the common synchronization signal, thereby synchronizing the receiver with the nominal predetermined timing of the data packet time slots.

16. A communication system for minimizing false detection of packet data due to noise, the communication system comprising:

at least one first transmitter for generating a transmitted signal comprising a data packet transmitted in at least one of a plurality of data packet time slots that have a nominal predetermined timing for receipt by a first receiver, wherein the data packet comprises a sync word and an error-detecting code word; and the first receiver coupled by a wireless link to the at least one first transmitter for receiving the transmitted signal, the first receiver comprising:

an antenna for intercepting the transmitted signal, wherein at least one of the plurality of data packet time slots contains the transmitted signal, while others of the plurality of data packet time slots contain only noise;

a first synchronization element for synchronizing the first receiver with the nominal predetermined timing of the plurality of data packet time slots;

a window determination element coupled to the first synchronization element for determining, from the nominal predetermined timing and an expected range of transmission delays, a plurality of time windows during which transmitted data packets can be received at the first receiver;

a receiver element coupled to the antenna and coupled to the window determination element for receiving and demodulating the transmitted signal received during each of the plurality of time windows;

a memory element coupled to the receiver element for storing data derived from the transmitted signal;

a processor coupled to the memory element for searching a predetermined portion of the data stored during each of the plurality of time windows to locate a point of maximum correlation between the data and a data template matching the sync word;

a decoder coupled to the processor for decoding the data packet throughout a data packet time slot by utilizing the point of maximum correlation as a reference;

an error detector coupled to the decoder for examining the error-detecting code word of the data packet decoded to determine whether the data packet is errored;

a validity definer coupled to the error detector for defining the data packet decoded to be a valid data packet if the data packet is not errored and to be an invalid data packet if the data packet is errored;

a link interface coupled to the processor for communicating the valid data packet through a communication link; and a user interface coupled to the processor for allowing a user to monitor and control the first receiver.

17. The communication system of claim 16, wherein the error-detecting code word is also an error-correcting code word, and wherein the first receiver further comprises an error corrector coupled to the decoder for performing error correction on the data packet before the error detector determines whether the data packet is errored.

18. The communication system of claim 16, wherein the error-detecting code word comprises a cyclic redundancy code (CRC) value, and wherein the error detector comprises a CRC checker for comparing the CRC value with an information portion of the error-detecting code word to determine whether the data packet is errored.

19. The communication system of claim 16, further comprising:

a second transmitter for transmitting a forward channel to at least one second receiver;

the at least one second receiver coupled by a wireless link to the second transmitter for receiving the forward channel, wherein at least one of the at least one first transmitter transmits the transmitted signal comprising the data packet in a uniquely assigned one of the plurality of data packet time slots on a reverse channel; and at least one second synchronization element coupled to the at least one second receiver and coupled to the at least one first transmitter for synchronizing the reverse channel with the forward channel, wherein the first synchronization element is coupled to the second transmitter for synchronizing the first receiver with the forward channel, thereby synchronizing the first receiver with the nominal predetermined timing of the plurality of data packet time slots.

20. The communication system of claim 16, wherein the communication system utilizes a common synchronization signal, and wherein the communication system further comprises:

a second transmitter for transmitting a forward channel to at least one second receiver;

the at least one second receiver coupled by a wireless link to the second transmitter for receiving the forward channel, wherein at least one of the at least one first transmitter transmits the transmitted signal comprising the data packet in a uniquely assigned one of the plurality of data packet time slots on a reverse channel; and at least one second synchronization element coupled to the at least one second receiver and coupled to the at least one first transmitter for synchronizing the reverse channel with the forward channel, wherein the first synchronization element is coupled to the common synchronization signal for synchronizing the first receiver thereto, and wherein the communication system further comprises a second synchronization element coupled to the second transmitter and coupled to the common synchronization signal for synchronizing the second transmitter thereto, thereby synchronizing the first receiver with the nominal predetermined timing of the plurality of data packet time slots.

* * * * *